Patented Oct. 3, 1944

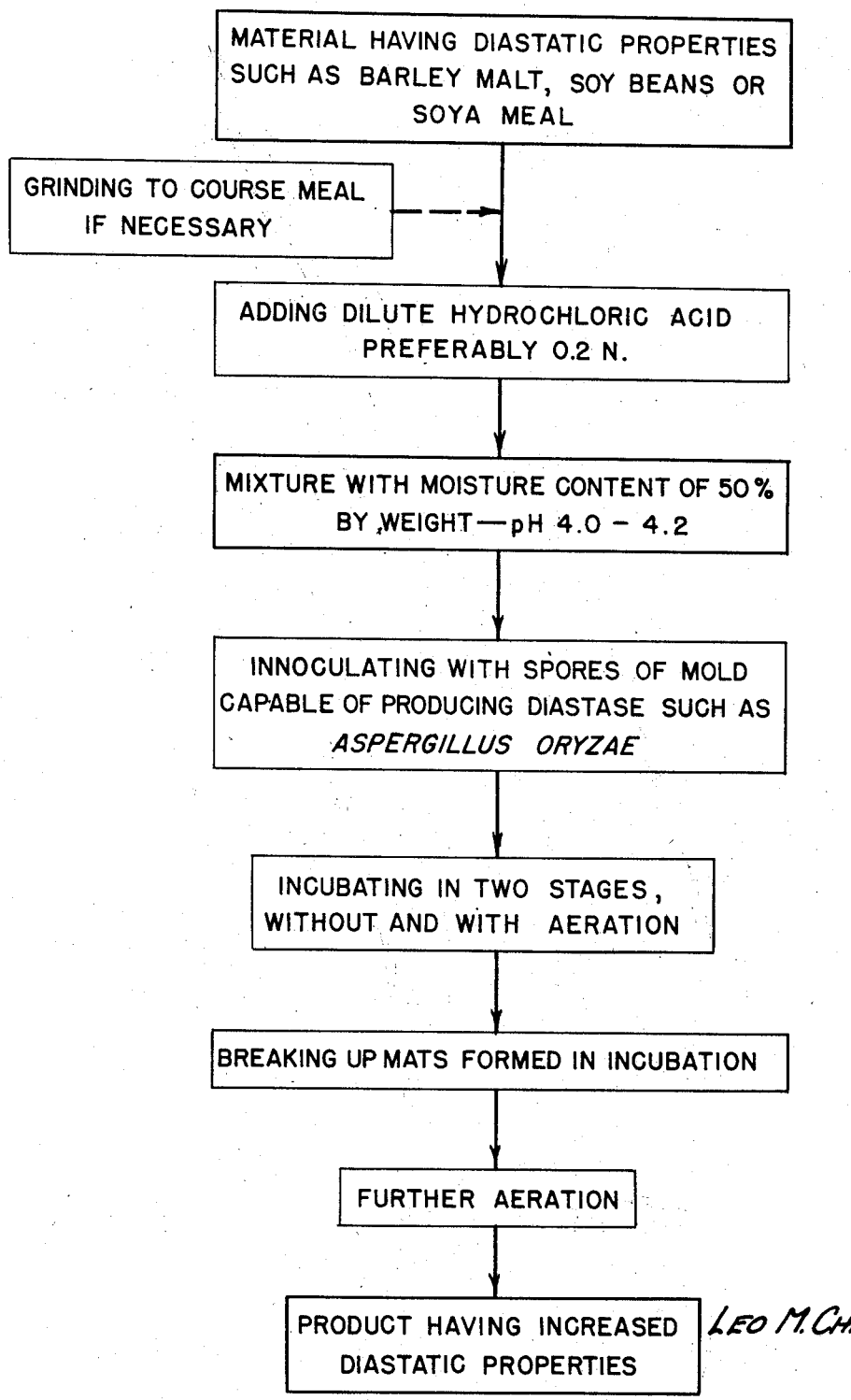

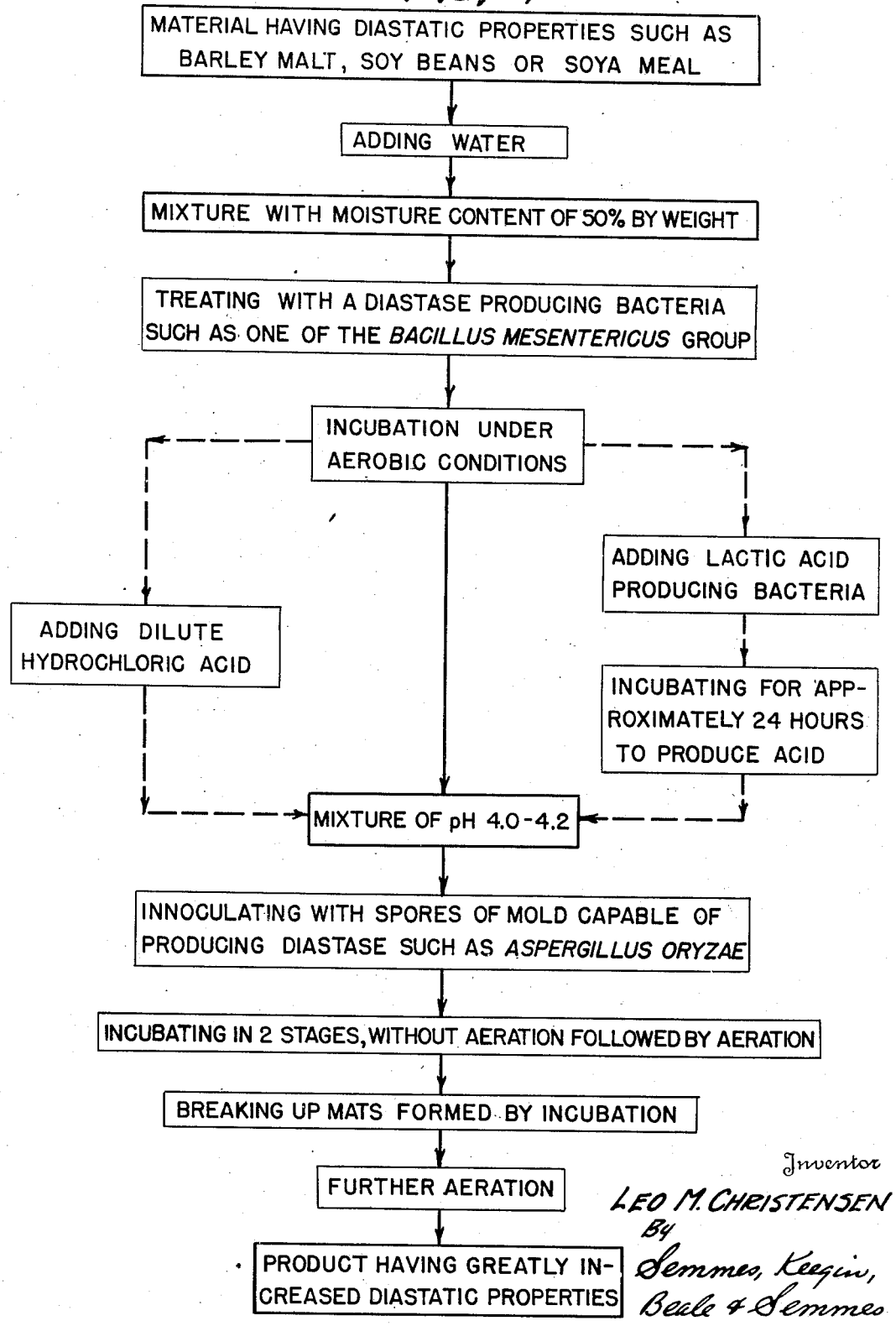

2,359,356

UNITED STATES PATENT OFFICE 2,359,356

METHOD OF INCREASING THE DIASTASE CONTENT OF MATERIALS

Leo M. Christensen, Miller, Nebr., assignor to National Agrol Company, Inc., New York, N. Y., a corporation of Delaware Application October 30, 1941, Serial No. 417,206

8 Claims. (Cl. 195—73)

This invention relates to a method of enhancing the diastatic power of materials and more especially to a method of increasing the diastatic power of materials already having a diastase content.

The present application is a continuation in part of my co-pending application entitled Method of promoting mold growth, Serial No. 360,206, filed October 7, 1940.

One of the objects of the present invention is to provide a method of enhancing the diastatic power of materials which already contain diastase by inoculating the material with a diastase producing mold and subjecting the mixture to conditions which will increase the diastatic power of the mixture.

A further object of this invention is to provide a method of enhancing the diastatic power of materials which already contain diastase by inoculating the material with bacteria of a diastase producing type and also a diastase producing mold in order to provide a material having an enhanced diastase content.

With these and other objects in view, the present invention embraces broadly the idea of increasing the diastase content of material already having diastatic power as for example soy beans, soya meal or malted cereal grain such as barley malt. In one method of practicing the invention, the selected material is inoculated with a mold capable of producing diastase. In the preferred method, a diastase producing bacteria is added to the selected material and after allowing the bacteria to grow the diastatic mold is added and the material is incubated. In either process, a product containing enhanced diastatic power is produced.

In the drawings:

Figure 1 discloses a method of producing a material having enhanced diastatic powers by adding a mold capable of producing diastase to a selected material having diastatic powers.

Figure 2 discloses a method in which a diastase producing bacteria is added to the selected material and allowed to incubate before the mold spores are added.

In practicing the process disclosed in Figure 1, a material having diastatic powers such as barley malt, soy beans, or soya meal from which the oil has been extracted is first selected and any solid matter which may be present is ground to form a coarse meal. Dilute hydrochloric acid is then added to this material in the proper proportions to form a mixture having approximately 50% by weight of the moisture and a hydrogen ion content of 4.0 to 4.2. Ordinarily an acid solution of 2 normal will be suitable to produce this result. The presence of acid during the process is necessary to prevent the growth of butyric acid producing bacteria as the material cannot be sterilized without destroying its diastase content.

After the acid has been added, mold spores of a type capable of producing diastase are introduced in the solution. Among these molds which are suitable for use in the process may be mentioned *Aspergillus oryzae* and species of the genera Rhizopus and Mucor. The presence of the acid solution in the previously mentioned concentration promotes the growth of these molds.

The material, after the addition of the selected mold spores, is subjected to an incubation. This incubation consists of approximately a 12 hour period without aeration and approximately a 12 hour period in which the temperature is maintained at less than 50° C., and preferably between 40 and 45° C. by controlling the oxidative processes by aeration.

After this treatment the mold mycelium is fully grown and forms the material into a solid mat. This mat is then broken into pieces of roughly one inch in diameter and the material is again aerated for approximately 24 hours. The resulting product has a high diastase content as it consists not only of the diastase contained in the original material but also that produced by the mold growth.

An apparatus which is suitable with slight changes to be used in this process is disclosed in my co-pending application Serial No. 360,205, filed October 7, 1940, now Patent No. 2,325,368, issued July 27, 1943.

After the final aeration, the product may be dried and stored or it may be ground and used in a fermentation process to convert starchy material into carbohydrates. If desired water may be added and the product made into a slurry before it is added to the fermenation process.

In the process disclosed in Figure 2, sufficient water is added to the selected material to form a moisture content which is 50% by weight of the total weight of the material. This mixture is then inoculated with a bacteria of a type capable of producing diastase such as one of the *Bacillus mesentericus* group.

After inoculation the bacteria are allowed to grow for from 24 to 48 hours under aerobic conditions produced by aeration to prevent the growth of butyric acid producing bacteria. If this aeration is not sufficient to prevent this growth and it may not be if the starting material contains large quantities of these bacteria, the process disclosed in Figure 1 should be selected instead of the present process.

After incubation, a sufficient quantity of dilute hydrochloric acid is added to produce a pH of from 4.0 to 4.2 and then mold spores of the type disclosed in connection with the process previously described are added. If desired dilute lactic acid may be added in place of dilute hydrochloric acid in sufficient quantities to produce a pH of from 4.0 to 4.2 before the mold spores are introduced into the mixture. This acid may be produced by incubating a culture of lactic acid producing bacteria for approximately 24 hours at a temperature of from 30 to 32° C. It is then added to the diastatic material.

After the proper hydrogen ion concentration has been produced by the addition of the selected acid the process continues in the manner previously described in connection with Figure 1. More specifically, after the addition of the selected mold spores the material is subjected to the two stage incubation. As previously described, this incubation consists of approximately a 12 hour period, without aeration and approximately a 12 hour period in which the temperature is maintained at less than 50° C. preferably between 40 and 45° C. by controlling the oxidative processes by aeration.

After this treatment the mats formed by the growth of the mold mycelium are broken into pieces of roughly one inch in diameter and the material is again aerated for approximately 24 hours. The resulting product has a very high diastase content due to the fact that it contains not only the diastase of the original starting material and that produced by the mold growth but also the diastase produced by the growth of the bacteria.

The final product may be dried and stored or it may be ground and used in a fermentation process to convert starchy material to carbohydrates. If desired a slurry may be formed by adding water to the ground material.

While for purposes of illustration, I have described two methods of producing a material of increased diastase content, it is obvious that a number of variations may be made without departing from the spirit of the invention. For example, other types of mold and bacteria of a suitable species may be employed, or the steps of the process may be varied within certain well defined limits.

I claim:

1. A method of preparing a diastatic material having an increased diastase content comprising selecting a diastatic material reducing the material to a coarse meal, adding a sufficient quantity of hydrochloric acid and water to the material to obtain a mixture having a pH of approximately 4.0 and a moisture content of approximately 50% by weight, adding spores of a diastatic mold to the mixture, incubating the inoculated material for a period without aeration, and then further incubating the material for an equal period of time with aeration to remove the heat of oxidation.

2. A method of preparing a diastatic material having an increased diastase content comprising selecting a diastatic material reducing the material to a coarse meal, adding a sufficient quantity of hydrochloric acid and water to the material to obtain a mixture having a pH of approximately 4.0 and a moisture content of approximately 50% by weight, adding spores of a diastatic mold to the mixture, incubating the inoculated material for a period of approximately twelve hours without aeration and then subjecting the material to a further incubation of approximately twelve hours with aeration to remove the heat of oxidation.

3. A method of preparing a diastatic material having an increased diastase content comprising selecting a diastatic material reducing the material to a coarse meal, adding a sufficient quantity of hydrochloric acid and water to the material to obtain a mixture having a pH within the range of from 4.0 to 4.2 and a moisture content of approximately 50% by weight, adding mold spores of the genus Aspergillus to the mixture and then incubating the inoculated material for a period of approximately twelve hours without aeration and then subjecting the material to a further incubation of approximately twelve hours with aeration to remove the heat of oxidation.

4. A method of preparing a diastatic material having an increased diastase content comprising selecting a diastatic material, grinding to form a coarse meal, adding a sufficient quantity of hydrochloric acid and water to the material to obtain a mixture having a pH within the range of from 4.0 to 4.2 and a moisture content of approximately 50% by weight, adding spores of a diastatic mold to the mixture, incubating the inoculated material for a period of approximately twelve hours without aeration, further incubating the material for a period of approximately twelve hours with aeration in order to maintain a temperature between 40 and 50° C., breaking the mats formed during the incubation and then subjecting the material to a further aeration.

5. A method of preparing a diastatic material having an increased diastase content comprising selecting a malted cereal grain, adding a sufficient quantity of hydrochloric acid and water to the malted material to obtain a mixture having a pH within the range of from 4.0 to 4.2 and a moisture content of approximately 50% by weight, adding mold spores of the genus Aspergillus to the mixture, incubating the inoculated material for a period of approximately twelve hours without aeration, further incubating the material for a period of approximately twelve hours with aeration to maintain a temperature of approximately 45 C., breaking the mats formed during the incubation into small particles and then subjecting the material to a further aeration.

6. A method of preparing a diastatic material having an increased diastase content comprising selecting a diastatic material, adding sufficient water to obtain a mixture having a moisture content of approximately 50%, adding bacteria of the Bacillus mesentericus group, incubating under aerobic conditions for from twenty-four to forty-eight hours, adding a sufficient quantity of hydrochloric acid to obtain a pH of approximately 4.0, inoculating with spores of a mold capable of producing diastase, incubating the inoculated material for a period of approximately twelve hours without aeration and then subjecting the material to a further incubation of appproximately twelve hours with aeration to remove the heat of oxidation.

7. A method of preparing a diastatic material having an increased diastase content comprising selecting a diastatic material, adding sufficient water to obtain a mixture having a moisture content of approximately 50%, adding bacteria of the Bacillus mesentericus group, incubating under aerobic conditions, adding a sufficient quantity of dilute hydrochloric acid to form a mixture having a pH within the range of from 4.0 to 4.2, inoculating with spores of the genus Aspergillus, incubating the inoculated material for a period of approximately twelve hours without aeration and then subjecting the material to a further incubation of approximately twelve hours with aeration to remove the heat of oxidation.

8. A method of preparing a diastatic material having an increased diastase content comprising selecting a malted cereal grain grinding to form a coarse meal, adding sufficient water to obtain a mixture having a moisture content of approximately 50%, adding bacteria of the Bacillus mesentericus group, incubating under aerobic conditions for a period of from twenty-four to forty-eight hours, adding a sufficient quantity of dilute hydrochloric acid to form a mixture having a pH within the range of from 4.0 to 4.2, inoculating with spores of a mold capable of producing diastase, incubating the inoculated material for a period of approximately twelve hours without aeration and then subjecting the material to a further incubation of approximately twelve hours with aeration to remove the heat of oxidation.

LEO M. CHRISTENSEN.